(12) United States Patent
Sato et al.

(10) Patent No.: US 6,565,937 B2
(45) Date of Patent: May 20, 2003

(54) RESIN-COATED SEAMLESS CAN (75) Inventors: Kazuhiro Sato, Yokohama (JP); Yuji Funagi, Yokohama (JP); Akihiko Morofuji, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 25 days.

(21) Appl. No.: 09/796,525

(22) Filed: Mar. 2, 2001

(65) Prior Publication Data
US 2001/0031327 A1 Oct. 18, 2001

(30) Foreign Application Priority Data
Mar. 2, 2000 (JP) .................................... 2000-057791

(51) Int. Cl.$^7$ .............................................. B32B 15/08
(52) U.S. Cl. ..................... 428/35.9; 428/35.8; 428/212; 428/458
(58) Field of Search .............................. 428/35.9, 212, 428/458

(56) References Cited

U.S. PATENT DOCUMENTS 5,137,762 A * 8/1992 Aizawa et al. ............. 428/35.8
6,025,056 A * 2/2000 Machii et al. .............. 428/204

* cited by examiner

Primary Examiner—Sandra M. Nolan
(74) Attorney, Agent, or Firm—Sughrue Mion, PLLC (57) ABSTRACT

A resin-coated seamless can satisfying such properties as high degree of workability, adhesiveness of film, resistance against high temperatures and wet heated condition, corrosion resistance and resistance against being dented. The resin-coated seamless can is formed of a resin-coated metal plate having substantially unoriented two layers including a lower layer on the inside of the can and a surface layer on the lower layer, wherein both of the layers comprise a polyethylene terephthalate/isophthalate having an intrinsic viscosity $[\eta]$ of not smaller than 0.7, and the surface layer contains an isophthalic acid in an amount of from 3 to 13 mol %, and the lower layer contains the isophthalic acid in an amount of from 8 to 25 mol %, which is larger than that of the surface layer, and the degree of crystallization of the surface layer is larger than the degree of crystallization of the lower layer in the upper part of the can wall.

9 Claims, 5 Drawing Sheets

RESIN-COATED SEAMLESS CAN

BACKGROUND OF THE INVENTION

1. Field of the Invention

The present invention relates to a resin-coated metal can. More specifically, the invention relates to a seamless can formed of a resin-coated metal plate which features excellent workability, adhesiveness, corrosion resistance and shock resistance, and prevents the oligomer component of a polyester from eluting out.

2. Prior Art

Side-seamless cans have heretofore been produced by draw-ironing a resin-coated metal plate that is obtained by applying an organic coating onto a metal blank. However, the organic coating on the inner surface is subject to be damaged by the tools. In the portions where the coating is damaged, further, the metal is exposed actually or latently, and starts metal picking up or corrodes from these portions. In producing the seamless cans, further, there occurs a plastic flow causing the size to increase in the direction of height of the can but causing the size to shrink in the circumferential direction of the can. When the plastic flow occurs, the adhesive force decreases between the metallic surface and the organic coating and, besides, the adhesive force between the two decreases with the passage of time due to residual distortion in the organic coating. This tendency becomes conspicuous particularly when the content is hot-packaged in the can and when the canned content is heat-sterilized at a low temperature or at a high temperature.

A draw-formed can which uses a laminated member on which a films of a polyethylene terephthalate or a polyethylene terephthalate/isophthalate is laminated as an organic coating, exhibits excellent barrier property against corrosive components and excellent workability accompanied, however, by a problem of a decrease in the shock resistance of the film covering the can and, particularly, a markedly deceased resistance against being dented when the container after worked is packaged with the content and is left to stand.

In order to solve this problem, Japanese Unexamined Patent Publication (Kokai) No. 108650/1995 teaches a draw-formed container made of a metal plate on which is formed a laminated film which comprises:

- a surface layer of a high-molecular oriented copolymerized polyester (A) derived from a diol component and from acid components of 85 to 97% of terephthalic acid and 3 to 15% of isophthalic acid; and
- a lower layer of a low-molecular oriented polymerized polyester (B) derived from a diol component and from acid components of 84.5 to 96.5% of terephthalic acid and 3.5 to 15.5% of isophthalic acid, the isophthalic acid being contained in an amount larger than the amount contained in the copolymerized polyester (A) of the surface layer.

Further, Japanese Unexamined Patent Publication (Kokai) No. 178485/1995 discloses a two-piece can obtained by draw-ironing or stretch-drawing and having an organic resin coating of which the main component is a polyester resin containing oriented crystals, the polyester resin layer having an inherent viscosity of not smaller than 0.60, and a parameter A representing the axial orientation degree of the oriented crystals in the direction of height of the can being $A \geq 0.40$, and a parameter B representing the axial orientation degree of crystals axially oriented in the direction of height of the can being $B \geq 0.00$.

The resin-coated metal plate forming the former draw-formed container exhibits flavor-retaining property, shock resistance and, particularly, resistance against being dented yet maintaining fairly excellent workability and adhesiveness. However, this oriented film laminated material cannot withstand high degree of drawing or draw-forming.

The latter metal can formed by stretch working and/or ironing has a decreased thickness in the can wall to decrease the weight and cost. As the thickness of the can wall becomes small, however, a high degree of workability is required for the resin applied to the metal plate, and it becomes necessary to use a resin-coated metal plate capable of withstanding a high degree of working.

In general, further, the can worked to a high degree builds up distortion to a considerable degree. Therefore, the resin-coated metal plate can be used for the vacuumed cans that build up distortion little but cannot be used for the pressured cans that build up distortion much.

When subjected to lowly acidic conditions such as containing coffee and stored in a hot vending machine or when subjected to severe conditions such as high-temperature wet heated condition like retort sterilization, even the resin-coated metal plate which is satisfactory under ordinary conditions loses corrosion resistance and resistance against being dented, permitting the oligomer component of polyester to elute out and causing the content to become turbid.

In recent years, in particular, a high-temperature retort has been desired for rational and efficient retort sterilization. In the retort at a high temperature, low-molecular components contained in the film migrate in increased amounts into the content. Among the low-molecular components, further, those components having relatively high molecular weights and which are very little soluble in an aqueous solution tend to be extracted markedly. Though the amount that migrates into the content may be very smaller than limit amounts stipulated under the Regulations of MITI, Japan and U.S. Food and Drug Administration Regulations, the components having relatively large high molecular weights migrated into the content are coagulated to form particles of large sizes resulting in the occurrence of turbidity when treated at high temperatures or preserved for extended periods of time, which is not psychologically desirable.

SUMMARY OF THE INVENTION

It is therefore an object of the present invention to provide a resin-coated seamless can that satisfies can properties such as high degree of workability, adhesion of film, resistance against high temperature and wet heated condition, corrosion resistance and resistance against being dented. Another object of the present invention is to provide a resin-coated seamless can which prevents low-molecular components from eluting into the content when treated at high temperatures and preserved for extended periods of time, which does not cause turbidity, and exhibits excellent flavor-retaining property.

According to the present invention, there is provided a resin-coated seamless can formed of a resin-coated metal plate having substantially unoriented two layers including a surface layer and a lower layer serving as a resin layer on the inner surface side of the can, wherein the surface layer comprises a polyethylene terephthalate/isophthalate containing an isophthalic acid in an amount of from 3 to 13 mol % and having an intrinsic viscosity $[\eta]$ of not smaller than 0.7, and the lower layer comprises a polyethylene terephthalate/isophthalate containing the isophthalic acid in an amount of from 8 to 25 mol %, which is larger than that of the surface layer, and having an intrinsic viscosity $[\eta]$ of not smaller than 0.7, the resin layer of the upper part of the can on the inner surface side satisfying the following formula (1), $$Cs > Ca \qquad (1)$$

where $Cs = Is_{973}/Is_{795}$, $Ca = Ia_{973}/Ia_{795}$, $Is_{973}$ is an infrared absorption intensity at 973 cm$^{-1}$ measured for the surface layer, $Is_{795}$ is an infrared absorption intensity at 795 cm$^{-1}$ measured for the surface layer, $Ia_{973}$ is an infrared absorption intensity at 973 cm$^{-1}$ measured for the lower layer and $Ia_{795}$ is an infrared absorption intensity at 795 cm$^{-1}$ measured for the lower layer.

In the resin-coated seamless can, it is desired that the coefficient of surface orientation of the resin layer on the inner surface side on the bottom of the can is not larger than 0.05.

In the present invention, it is desired that the half-crystallization time of the lower layer at 160° C. is not shorter than 100 seconds, and that the terephthalate/isophthalate resin of the surface layer and of the lower layer are produced by the solid-phase polymerization method.

It is further desired that the surface layer (A) and the lower layer (B) have a thickness ratio of, $$A:B = 1:15 \text{ to } 15:1$$

and that the surface layer and the lower layer are laminated by the lamination of multi-layer cast films or by the co-extruded coating, and have not been substantially oriented in a state of the resin-coated metal plate before being formed into a can.

It is desired that the seamless can of the invention is obtained by drawing or stretch-drawing the resin-coated metal plate, or by ironing the resin-coated metal plate.

In the seamless can, further, the surface layer and the lower layer of the upper part of the can have an amorphous parameter (F) defined by the following formula (2), $$F = -0.95 X_{100} - 0.52 X_{-105} + 8.4 \qquad (2)$$

wherein $X_{100}$ is a maximum value of normalized strength of X-ray diffraction gotten by X-ray diffraction pole figure diagram of (100) pole, and $X_{-105}$ is a maximum value of normalized strength of X-ray diffraction gotten by X-ray diffraction pole figure diagram of (–105) pole, of not smaller than 3.

DETAILED DESCRIPTION OF THE INVENTION

In the seamless can of the present invention, the resin layer on the inner surface side of the can including the surface layer and the lower layer has not been substantially oriented in a state of the resin-coated metal plate before being formed into a can, the surface layer on the inner surface of the can is a polyethylene terephthalate lowly modified with isophthalic acid and containing 3 to 13 mol % of isophthalic acid, the lower layer on the inner surface of the can is a polyethylene terephthalate highly modified with isophthalic acid and containing 8 to 25 mol % of isophthalic acid, both of which having an intrinsic viscosity [η] of not smaller than 0.7, and the resin layer of the upper part of the can on the inner surface side satisfying the following formula (1), $$Cs > Ca \qquad (1)$$

where $Cs = Is_{973}/Is_{795}$, $Ca = Ia_{973}/Ia_{795}$, $Is_{973}$ is an infrared absorption intensity at 973 cm$^{-1}$ measured for the surface layer, $Is_{795}$ is an infrared absorption intensity at 795 cm$^{-1}$ measured for the surface layer, $Ia_{973}$ is an infrared absorption intensity at 973 cm$^{-1}$ measured for the lower layer ans $Ia_{795}$ is an infrared absorption intensity at 795 cm$^{-1}$ measured for the lower layer, and, preferably, the resin layer on the inner surface side on the bottom of the can having a coefficient of surface orientation of not larger than 0.05.

In the seamless can of the present invention, a feature resides in that the resin coating on the inner surface side of the can is constituted by two layers of polyethylene terephthalate/isophthalate (hereinafter often referred to as PET/IA) containing the isophthalic acid in different amounts, and the two-layer resin coating on the inner surface side of the can has a two-layer constitution that has not been substantially oriented in a state of the resin-coated metal plate of before being formed into a seamless can. This imparts excellent workability, adhesive property and resistance against being dented, and makes it possible to obtain corrosion resistance and resistance against high temperatures and wet heated condition like when a oriented film is applied to can.

That is, when the film is drawn and is oriented, the mechanical strength such as tensile strength and the like is improved but the elongation at breakage decreases. Therefore, when subjected to a severe working like draw-forming, stretch working or ironing, the unoriented film that has not been oriented can be excellently worked without being broken by working.

It is, however, considered that the unoriented film which has not been oriented exhibits inferior barrier property to the drawn film. In the present invention, the polyethylene terephthalate/isophthalate containing 3 to 13 mol % of isophthalic acid is formed as the surface layer, and the polyethylene terephthalate/isophthalate containing 8 to 25 mol % of isophthalic acid, which is larger than that of the surface layer, is formed as the lower layer. That is, two layers are laminated to obtain a barrier property nearly comparable to that of the oriented film.

The seamless can of the invention is obtained by draw-forming, stretch-forming or ironing the resin-coated metal plate and, hence, has a feature in that the degree of crystallization of the surface layer is larger than the degree of crystallization of the lower layer in the upper part of the can wall. That is, relying upon the total reflection measuring method (ATR method) of infrared spectroscopic method (IR), the surface layer and the lower layer are measured for their infrared absorption intensities at 973 cm$^{-1}$ (measuring depth of 2.7 μm) and at 795 cm$^{-1}$ (measuring depth of 3.3 μm), corrected as Cs (degree of crystallization of the surface layer)=$Is_{973}/Is_{795}$ and Ca (degree of crystallization of the lower layer)=$Ia_{973}/Ia_{795}$, to obtain a degree of crystallization that does not vary depending upon the thickness of the layer, the surface layer having a larger degree of crystallization, i.e., Cs>Ca.

This is because, upon subjecting to the drawing, the surface layer is oriented and crystallized to exhibit improved barrier property, improved corrosion resistance, improved resistance against being dented and improved resistance against high temperatures and wet heated condition like when the oriented film is used. Further, the lower layer on the side of the metal plate, too, is oriented and crystallized to suppress disorderly crystallization or thermal crystallization through the heat treatment after the content has been packaged, and exhibiting excellent adhesiveness to the metal plate.

In the seamless can of the invention, the bottom portion of the can is not almost drawn. Therefore, the resin-coated layer in the inner surface of the bottom of the can is maintained in a state of not being oriented, and the coefficient of surface orientation is not larger than 0.05. The method of measuring the coefficient of surface orientation will be described later.

Further, the seamless can of the present invention features a high degree of crystal orientation in the structure of the film of the can wall portion compared with the cans produced by using a resin-coated metal plate on which a oriented film is laminated. That is, when the resin-coated metal plate is subjected to the working such as drawing, draw-ironing or stretch-draw-ironing, the resin film formed on the surface of the metal plate is drawn and is oriented following the plastic flow of the metal plate. Here, however, the degree of orientation is different from that of the one that uses the oriented film.

Figure 1:
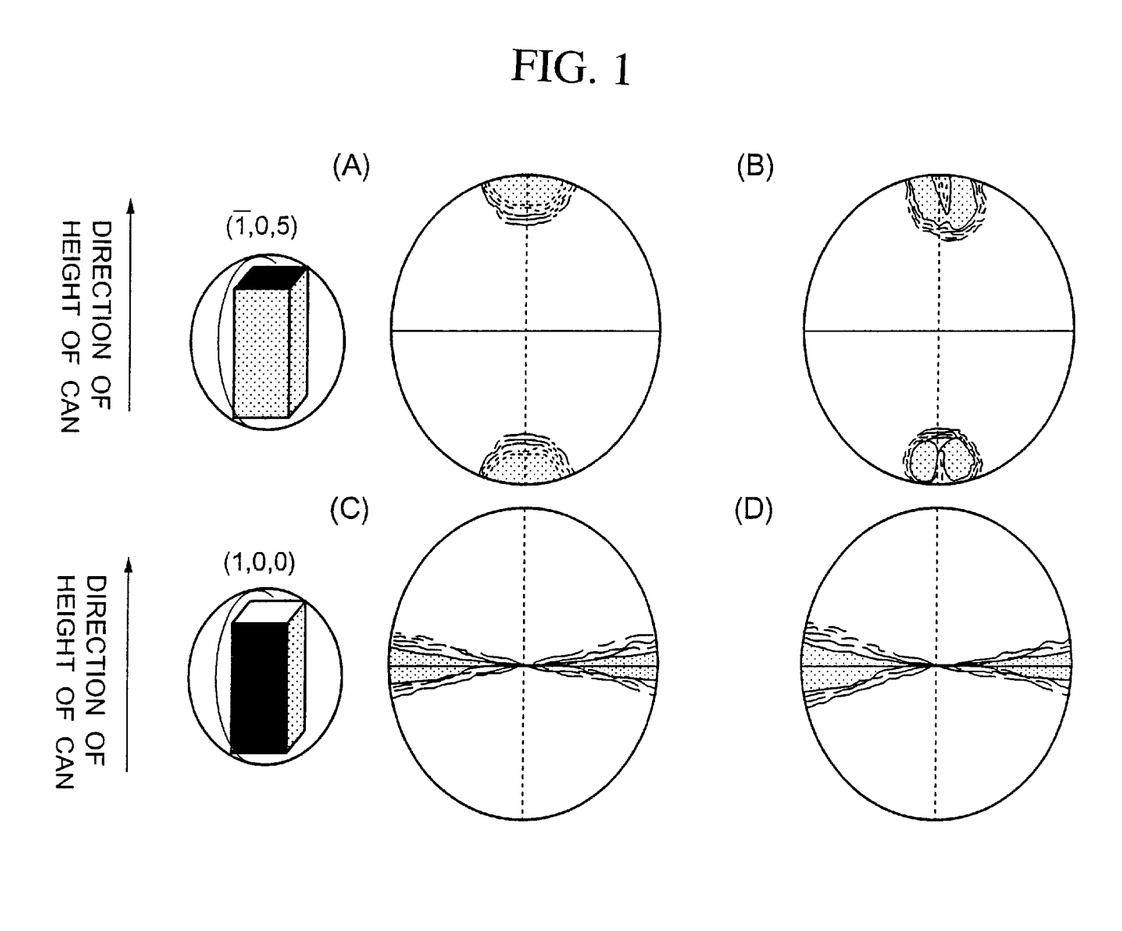
FIG. 1 is pole figure illustrating the crystalline structure of a film of a wall portion of a resin-coated metal can.

FIG. 1 is a normalized pole figure of the (100) plane and of the (–105) plane of the film of the wall portion of the resin-coated metal can obtained in Example 1 that will be described later. This diagram of normalized pole figure is a stereo projection showing the orientation of poles of a crystal plane and a change in the density of the poles, i.e., of the reciprocal lattice points, and effectively expresses the degree of orientation of the film.

FIG. 1(A) is a diagram of normalized pole figure of the (–105) plane perpendicular to the film surface of the can wall using a member on which the oriented film is laminated, FIG. 1(B) is a normalized pole figure of the (–105) plane perpendicular to the film surface of a can wall using a member on which the unoriented film of the invention is laminated, FIG. 1(C) is a normalized pole figure of the (100) plane perpendicular to the film surface of the can wall using the member on which the oriented film is laminated, and FIG. 1(D) is a normalized pole figure of the (100) plane perpendicular to the film surface of a can wall using a member on which the unoriented film of the present invention is laminated.

The pole figure is measured relying upon a principle that has been widely known as briefly described below.

First, the turn of the film surface about the normal axis is denoted by β, the turn of the film surface about the parallel axis is denoted by α, the intensity is measured by the Schultz's transmission method from α=0° to 50° and is measured by the Schultz's reflection method over 50°. To correct the seam between them, an angle is provided for measuring both transmission and reflection.

The measured intensity data are subjected to the background correction and absorption correction to calculate the corrected intensity Ic and to finally effect the normalization.

For normalization, the amorphous sample is similarly measured to find average intensity <I>. The corrected intensity Ic is divided by the amorphous average intensity <I> thereby to form a normalized intensity Ic/<I> and to obtain a diagram of contour lines of intensities shown in FIG. 1. It can be said that the normalized intensity is an intensity ratio that is found with the average intensity of the amorphous sample as 1.

From the diagram of contour lines can be readily read a maximum value $X_{100}$ of normalized intensity of the (100) plane and a maximum value $X_{-105}$ of normalized intensity of the (–105) plane.

After the draw-ironing as will be obvious from FIG. 1, the member on which the unoriented film is laminated is oriented nearly equally to the member on which the oriented film is laminated, but is highly oriented along the one axis compared with the member on which the oriented film is laminated, and has a low surface orientation and is highly oriented compared to the oriented film. Therefore, the present invention suppresses disorderly crystallization or thermal crystallization that may be caused by retort sterilization, and makes it possible to improve adhesiveness, resistance against high temperatures and wet heated condition, corrosion resistance and resistance against being dented.

In the present invention, it is particularly desired to so control the crystal orientation that the surface layer and the lower layer of the upper part of the can wall have an amorphous parameter (F) defined by the following formula (2), $$F=-0.95X_{100}-0.52X_{-105}+8.4 \qquad (2)$$

wherein $X_{100}$ is a maximum value of normalized strength of X-ray diffraction gotten by X-ray diffraction pole figure diagram of (100) plane, and $X_{-105}$ is a maximum value of normalized strength of X-ray diffraction gotten by X-ray diffraction pole figure diagram of (–105) plane, of not smaller than 3.

The amorphous parameter (F) represents a degree of crystallization required by the film on the can wall to exhibit excellent corrosion resistance. When the amorphous parameter (F) is not smaller than 3, the resin layer offers excellent corrosion resistance after retort sterilization even when stored for extended periods of time at a high temperature under wet heated conditions like in a hot vending machine.

The above formula is an empirical formula which the inventors have derived from the results of extensive experiment and from the duplexed regression analysis thereof, and pertinently expresses a relationship between the maximum values $X_{100}$, $X_{-105}$ of normalized intensities of the can wall film and the degree of corrosion (numerical value of from 1 to 5) of the can that actually occurs.

The amorphous parameter (F) has a contribution factor of 0.83 (1 is a maximum) as found from a change in the regression and from a change in the sum, which is highly reliable explaining 83% of data possessed by the amorphous parameter (F) in terms of changes in the maximum values $X_{100}$, $X_{-105}$ of the normalized strengths of the can wall film.

In the present invention, it is particularly desired that the polyethylene terephthalate/isophthalate of the lower layer has a half-crystallization temperature at 160° C. of not shorter than 100 seconds and, particularly, not shorter than 150 seconds. The half-crystallization time is the time which is spent for accomplishing a half of the degree of crystallization that can be reached by the isothermal crystallization method which maintains the amorphous sample at a temperature lower than the melting point and observes the condition of crystals that grow with the passage of time, and serves as a rough indication of the rate of crystallization.

According to the present invention, the half-crystallization time is set to be not shorter than 100 seconds at 160° C. to suppress the crystallization of the lower layer, and to improve adhesiveness of the lower layer to the metal plate and workability for drawing.

In general, further, the polyester loses its molecular weight by the degradation reaction due to hydrolysis during the high-temperature and highly humid treatment such as retort sterilization. A decrease in the molecular weight promotes the thermal crystallization. In the resin-coated seamless can of the present invention, however, the molecular weight is effectively prevented from decreasing even when it is put to the retort sterilization.

Figure 2:
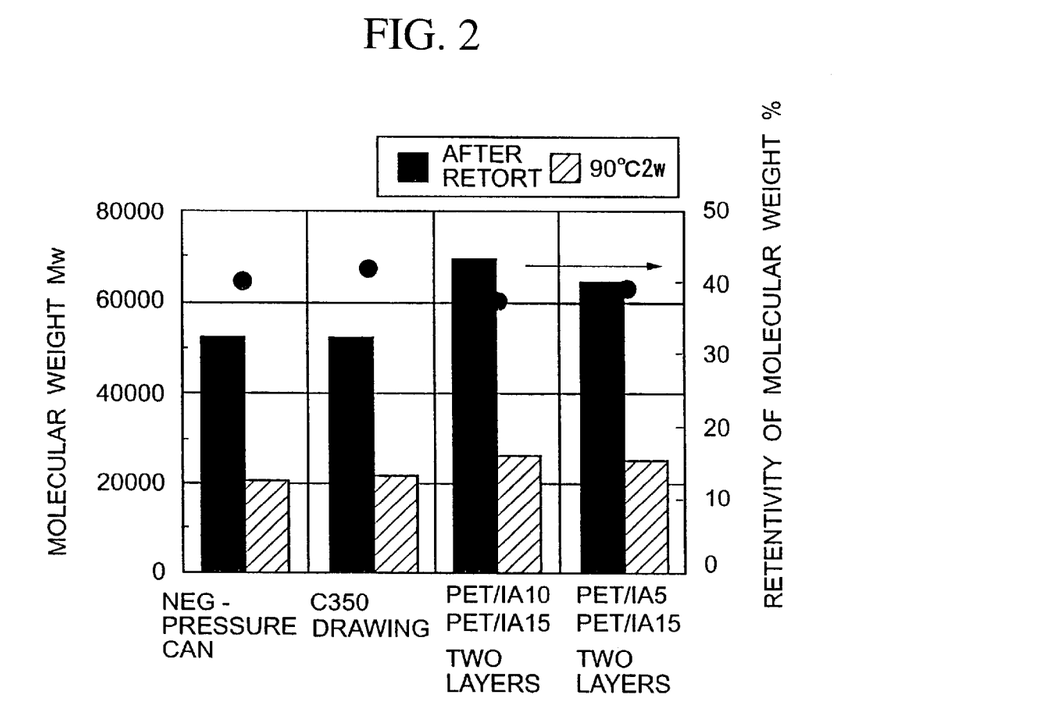
FIG. 2 is a diagram illustrating a change in the molecular weight and retentivity of molecular weight after retort-sterilization and preserved at 90° C. for two weeks.

FIG. 2 is a diagram illustrating a drop in the molecular weight and the retentivity of molecular weight when a can filled with black coffee which is a lowly acidic beverage is preserved at a temperature of 90° C. for two weeks after retort sterilization. As will be obvious from FIG. 2, the seamless can of the present invention possesses a molecular weight retentivity comparable to that of the oriented film even when it is placed under high-temperature and wet heated conditions like in the retort sterilization or in a hot vending machine. Even when placed in the high-temperature and wet heated conditions, therefore, the seamless can maintains excellent barrier property as well as corrosion resistance and resistance against being dented which are superior to those of when the drawn film is used alone.

In the present invention, it is also an important feature to use polyethylene terephthalate/isophthalate layers containing isophthalic acid in different amounts in combination in a manner that the surface layer contains the isophthalic acid in an amount of as small as 3 to 13 mol % and the lower layer contains the isophthalic acid in an amount of 8 to 25 mol %, which is larger than that of the surface layer.

That is, the isophthalic acid-modified polyester containing the isophthalic acid as an acid component exhibits a large barrier effect against various components and little adsorbs flavor components of the content. When the content of the isophthalic acid in the surface layer is larger than the above range, it becomes difficult to impart sufficient barrier effect against the adsorption of flavor components of the content and further becomes difficult to impart, to the can that is formed, sufficient resistance against being dented. The isophthalic acid that is contained in an amount in the above-mentioned range helps maintain the orientation property of the surface layer on a high level in a state of the draw-formed container, and is important in imparting the same effect as that of when the oriented film is used.

When the content of the isophthalic acid in the lower layer is greater than the above range, on the other hand, the content of the low-molecular components increases in the copolymerized polyester, and the low-molecular components that are eluted out tend to impair the flavor-retaining property. Further, when the amount of the isophthalic acid component is smaller than the above range, adhesion to the metal decreases, workability decreases, the tendency of thermal crystallization increases after melted, and the mechanical strength and shock resistance decrease, too. The isophthalic acid that is contained in an amount in the above-mentioned range is important for enhancing the adhesion to the metal base and for enhancing the workability yet maintaining the flavor-retaining property on an excellently high level and for enhancing the toughness of the laminated film by lowering a maximum degree of crystallization that can be reached.

Further, since the lower layer contains the isophthalic acid in an amount larger than that in the surface layer, a sufficient adhesion is maintained even for a severe working such as drawing, preventing crystallization during the melting and heat treatment and markedly enhancing the resistance against being dented.

[Resin-Coated Metal Plate]
(Laminated Films)

The polyethylene/isophthalate which is a thermoplastic polyester used as the surface layer of the resin-coated plate of the present invention contains a diol component which is chiefly an ethylene glycol and a dibasic acid component which is chiefly a terephthalic acid. Here, the surface layer contains the isophthalic acid in an amount of 3 to 13 mol % and the lower layer contains the isophthalic acid in an amount of 8 to 25 mol %.

As minor components, there may, as a matter of course, be contained in small amounts the dibasic acids such as p-β-oxyethoxybenzoic acid, naphthalene-2,6-dicarboxylic acid, diphenoxyethane-4,4'-dicarboxylic acid, 5-sodiumsulfoisophthalic acid, hexahydroterephthalic acid, adipic acid, sebacic acid, dimeric acid, trimellitic acid and pyromellitic acid, and glycol components such as propylene glycol, 1,4-butanediol, neopentyl glycol, 1,6-hexylene glycol, diethylene glycol, triethylene glycol, cyclohexane dimethanol, bisphenol A ethylene oxide adduct, glycerol, trimethylolpropane, pentaerythritol and dipentaerithritol.

The PET/IA can be prepared by a known preparation method such as melt-polycondensation method but is particularly desirably prepared by a solid-phase polymerization method. In the solid-phase polymerization method, a polyethylene terephthalate of a low degree of polymerization is once synthesized by the melt-polycondensation method, cooled, solidified, granulated or pulverized, followed by heating at 220 to 250° C. in vacuum or in an inert gas stream. According to this method, the reaction is conducted at a relatively low temperature permitting little pyrolysis, realizing highly efficient polycondensation containing carboxylic acid in very small amounts. Therefore, there is obtained a PET/IA of a high degree of polymerization permitting the oligomer to be contained in small amounts in the resin and effectively preventing the oligomer component from eluting out.

It is desired that the thermoplastic polyester has an intrinsic viscosity of not smaller than 0.7 and, particularly, in a range of from 0.8 to 1.2 as measured by using a phenol/tetrachloroethane mixed solvent, from the standpoint of barrier property against corrosive components and mechanical properties. It is further desired that the PET/IA used as the surface layer has a number average molecular weight of not smaller than 5000 and, particularly, from 10000 to 40000 and that the PET/IA used as the lower layer has a number average molecular weight of 5000 to 50000 and, particularly, 10000 to 40000 from the standpoint of improving the resistance against being dented. It is further desired that the PET/IA used as the surface layer has a glass transition point of not lower than 50° C. and, particularly, not lower than 60° C. and that the PET/IA used as the lower layer has a glass transition point of not lower than 40° C. and, particularly, not lower than 50° C. from the standpoint of preventing the oligomer component from eluting into the content.

Further, the surface layer and the lower layer may be blended with known blending agents used for the films, i.e., antiblocking agent such as amorphous silica, etc., pigment such as titanium dioxide, etc., various antistatic agents and lubricant according to known recipe.

In the present invention, it is desired that the above surface layer (A) has a thickness in a range of from 0.5 to 25 μm and, particularly, in a range of from 1 to 10 μm and that the lower layer (B) has a thickness in a range of from 0.5 to 50 μm and, particularly, in a range of from 5 to 40 μm.

It is further desired that the surface layer (A) and the lower layer (B) have a thickness ratio of, A:B=1:15 to 15:1 from the standpoint of workability, corrosion resistance and flavor-retaining property.

The laminated film of the present invention can be produced by a known laminating method but is preferably produced by the lamination of multi-layer cast films or by the co-extrusion coating.

The multi-layer cast films are laminated by introducing the PET/IA chips of the surface layer and of the lower layer into separate extruders, heat-melting them and extruding them like sheets through the die, and cooling and solidifying them on a casting drum. On the other hand, the co-extrusion coating is effected by using two extruders, feeding the PET/IA resins of the surface layer and of the lower layer into extruders and extruding through the die.

In the present invention, the laminated film is formed by the lamination of multi-layer cast films or by the co-extrusion coating without using adhesive, accomplishing firm interlayer adhesion and enhancing the workability.

(Metal Plate)

As the metal plate used in the present invention, there can be used a variety of surface-treated steel plates and light metal plates such as of aluminum. The surface-treated steel plate may be the one obtained by annealing a cold-rolled steel plate, followed by the secondary cold rolling, and one or two or more kinds of surface treatments such as zinc plating, tin plating, nickel plating, electrolytic chromate treatment and chromate treatment. There can be further used an aluminum-coated steel plate plated with aluminum or a steel plate on which aluminum is rolled.

As the light metal plate, there can be used the so-called pure aluminum plate as well as an aluminum alloy plate.

The initial thickness of the metal plate may differ depending upon the kind of the metal, use or size of the container. Generally, however, the metal plate has an initial thickness of from 0.10 to 0.50 mm. Among the metal plates, the surface-treated steel plate has a thickness of from 0.10 to 0.30 mm, and the light metal plate has a thickness of from 0.15 to 0.40 mm.

(Layer Constitution)

Figure 3:
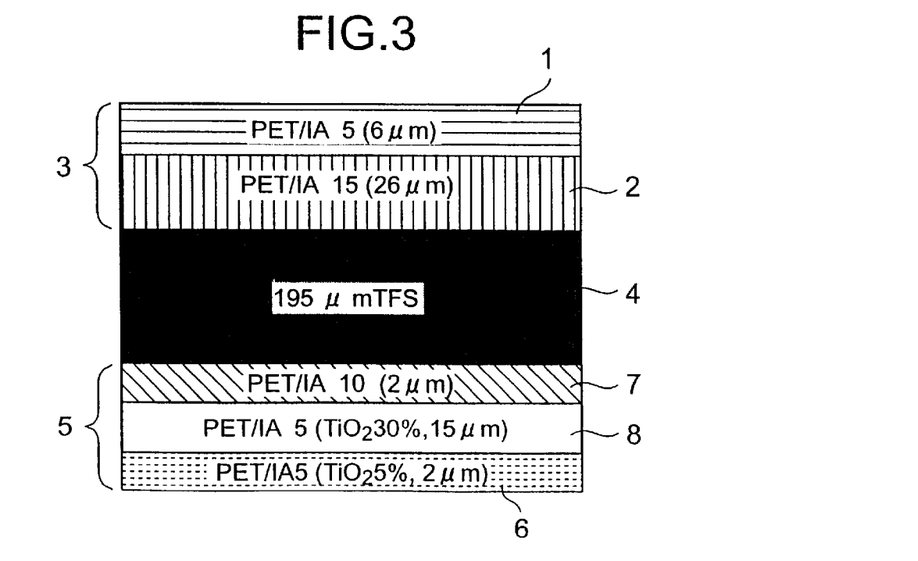
FIG. 3 is a diagram illustrating a constitution of layers of a resin-coated metal plate used in the present invention.

The resin-coated metal plate used for the seamless can of the present invention has, as shown in FIG. 3, a laminated film 3 of the above-mentioned surface layer 1 and the lower layer 2, formed on one side (which becomes the inner side of a can) of a metal plate 4. On the other side of the metal plate 4 is formed an outer coating 5 which may be the same as the laminated film 3 or may be an ordinary coating for cans or a resin film. In the example shown in FIG. 3, the outer coating 5 is, like that of the inner surface side of a can, a laminated film comprising a surface layer 6 which is a white coating layer of a polyethylene terephthalate/isophthalate containing a small amount of isophthalic acid and blended with a small amount of titanium oxide, a lower layer 7 of a polyethylene terepthalate/isophthalate containing a large amount of isophthalic acid, and a white coating layer 8 of a polyethylene terephthalate/isophthalate blended with titanium dioxide like the surface layer 6.

In the present invention, a variety of constitutions can be employed in addition to the above-mentioned layer constitution, and a widely known primer for adhesion may be provided between the metal plate and the lower layer on the inner surface side of a can or between the metal plate and the lower layer on the outer surface side of a can. The adhesive primer exhibits excellent adhesiveness to both the metal blank and the film. As the primer coating exhibiting excellent adhesiveness and corrosion resistance, there can be used a phenol epoxy coating material comprising a resol-type phenolaldehyde resin derived from various phenols and a formaldehyde, and a bisphenol epoxy resin, and, particularly, a coating material containing a phenol resin and an epoxy resin at a weight ratio of from 50:50 to 1:99 and, particularly, at a weight ratio of from 40:60 to 5:95. In general, the adhesive primer layer is formed maintaining a thickness of from 0.01 to 10 μm on either the metal blank in advance or on the polyester film.

[Seamless Can]

The seamless can of the invention is produced by subjecting the above-mentioned resin-coated metal plate to known means such as draw-redraw working, bend-elongation (stretch working) by draw-redrawing, bend-elongation-ironing by draw-redrawing, or draw-ironing in a manner that the surface coated with PET/IA becomes the inner surface of the can.

The seamless can of the invention can be produced by the above-mentioned means while decreasing the thickness of the side wall by bend-elongation relying upon the redrawing and/or by ironing.

The thickness is decreased in such a fashion that the side wall portion is decreased to be from 20 to 95% and, particularly, from 30 to 85% of the thickness of the blank of the resin-coated metal plate by bend-elongation and/or ironing compared to the thickness of the bottom portion.

According to, for example, the bend-elongation relying upon the draw-redrawing, a pre-drawn cup is formed by drawing the resin-coated metal plate at a drawing ratio of 1.1 to 3.0, the cup is redrawn by using a redrawing punch and a redrawing die at a drawing ratio of from 1.5 to 5.0, and the bend-elongation is effected by selecting the radius (Rd) of curvature of the working corner of the redrawing die to be from 1 to 2.9 times and, particularly, from 1.5 to 2.9 times of the metal blank thickness (tB), thereby to effectively decrease the thickness. This eliminates a change in the thickness between the lower part and the upper part of the side wall, and makes it possible to evenly decrease the thickness over the whole side walls.

Generally, the thickness of the side wall of the can wall can be decreased to be smaller than 80%, or to be 45% and, particularly, to be 40% of the blank thickness (tB).

In the redraw working, further, an ironing portion may be arranged following the bend-elongating portion by the redrawing die, to subject the side wall to the ironing.

By effecting the bend-elongation and ironing, the thickness can desirably be decreased to accomplish a thickness-reduction ratio RI as defined by the following formula (4), $$RI=\{(tB-tW)/tB\}\times 100 \quad (4)$$

wherein tB is a thickness of the blank, and tW is a thickness of the side wall, of from 20 to 95% and, particularly, from 30 to 85%.

According to the present invention as described above, it becomes possible to produce bend-elongated cans by draw-redrawing, to produce bend-elongation-ironed cans by draw-redrawing, or to produce draw-ironed cans having a very decreased thickness featuring a high degree of workability and, hence, becomes possible to produce seamless cans for which a high degree of workability is required having an equivalent strain (reckoned as nominal strain) reaching a maximum of 400%, that could not be produced from the conventional resin-coated metal plates.

EXAMPLES

The invention will now be described by way of Examples.

Resin-coated metal plates described in (1) below were prepared by using resins shown in Table 1. The resin properties described in (2) and (3) below were measured as shown in Table 1. The resin-coated metal plates were formed into cans by a method described in (8) below, and properties of the resin layers on the inner surface of the can described in (4) to (6) below were found. The cans were evaluated as described in (7) below. The properties and the evaluated results of the cans were as shown in Table 2.

As will be understood from Table 2, the cans according to Examples of the present invention exhibit good formability, corrosion resistance and less turbidity due to elution by retorting, and are best suited for preserving beverages.

(1) Preparation of Resin-coated Metal Plates.

By using the resins shown in Table 1, the resin-coated metal plates were prepared by the method shown in Table 2. In laminating the films, the resins were fed to an extruder, passed through a two-layer T-die, and extruded at thickness ratios shown in Table 1 such that the total thickness was 30 µm. The extruded films were cooled by a cooling roll, and were taken up to use them as cast films. Here, the temperatures were selected to be best suited for the resins.

As for the biaxially oriented film, a copolymerized PET resin containing 10 mol % of isophthalic acid was extruded in the same manner as described above, and was then biaxially oriented by 3.0 times in the longitudinal direction and by 3.0 times in the transverse direction, and was heat-set at 180° C. to obtain a oriented film.

The thus obtained film was heat-laminated on both surfaces of a TFS steel plate (having a thickness of 0.18 mm, plated with metal chromium in an amount of 120 mg/m$^2$ and with a chromium oxide hydrate in an amount of 15 mg/m$^2$) or on both surfaces of an aluminum alloy plate (A3004H39) having a thickness of 0.24 mm, followed readily by cooling with water to obtain a laminated member. Here, the temperature of the metal plate of before being laminated was set to be higher than the melting point of the polyester by 15° C.

The lamination was effected at a laminate roll temperature of 150° C. while passing the plate at a speed of 40 m/min to obtain a resin-coated metal plate.

In the method of extrusion-lamination, the resins of the compositions shown in Table 1 were dry-blended and were fed to an extruder of a diameter of 65 mm equipped with an extrusion-lamination facility so as to be melt-extruded onto a TFS steel plate (having a thickness of 0.18 mm, plated with metal chromium in an amount of 120 mg/m$^2$ and with a chromium oxide hydrate in an amount of 15 mg/m$^2$) heated at 250° C. maintaining a thickness of 20 µm on the outer surface side, i.e., such that the film was laminated on one side of the TFS steel plate. In order to form the film on the inner surface side, further, the same resin component was fed into an extruder having a diameter of 65 mm equipped with an extrusion-lamination facility. Then, the plate was heated at a temperature lower than the melting point of the resin by 30° C., and the resin was melt-extruded so as to form a film maintaining a thickness of 30 µm, i.e., the film being laminated on the other surface to thereby obtain a resin-coated metal plate.

(2) Intrinsic Viscosity of the Resin.

200 Milligrams of the resin shown in Table 1 was dissolved in a phenol/1,1,2,2-tetrachloroethane mixed solvent (weight ratio of 1:1) at 110° C., and was measured for its specific viscosity at 30° C. by using the Ubbelohde's viscometer.

The intrinsic viscosity [η] (dl/g) was found in compliance with the following formula, $$[\eta]=[(-1+(1+4K'\eta_{sp})^{1/2})/2K'C]$$

where K' is the Huggins' constant (=0.33), C is a concentration (g/100 ml), and $\eta_{sp}$ is a specific viscosity [=(falling time of a solution−falling time of a solvent)/falling time of the solvent].

(3) Half-crystallization Time.

5 Milligrams of the resin shown in Table 1 was measured by using a differential scanning calorimeter (DSC-7 manufactured by Parkin-Elmer Co.). The measurement was taken by, first, heating the resin at a rate of 110° C./min from room temperature up to 280° C., holding at this temperature for 2 minutes, quickly quenching the resin down to 160° C. and holding the temperature at 160° C. If the amount of heat absorption is indicated from the start of holding the temperature, there appears a peak of heat absorption. The time of the peak is regarded to be the half-crystallization time.

(4) Measurement of Crystallization Degrees Cs, Ca of the Resin Layer on the Inner Surface of the Upper Part of the Can.

Figure 4:
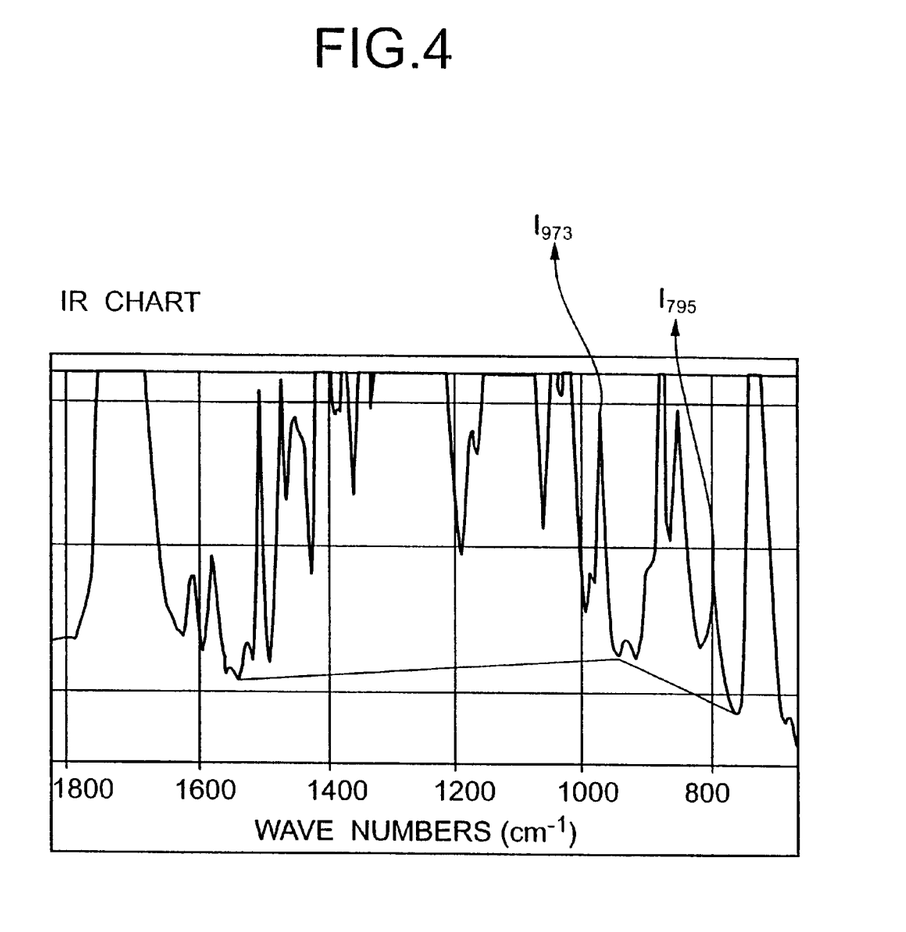
FIG. 4 is a infrared spectroscopy chart of a surface layer and of a lower layer by an ATR method.
Figure 5:
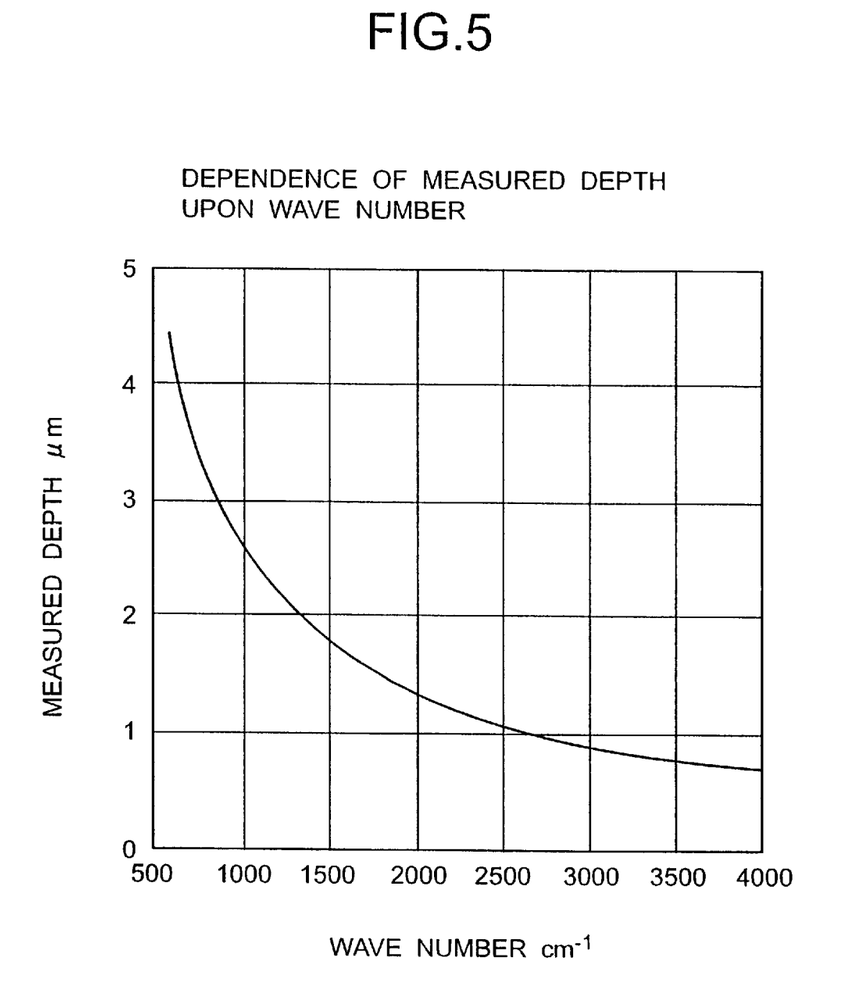
FIG. 5 is a diagram illustrating the dependence of the measured depth upon the wave number by the ATR method.
Figure 6:
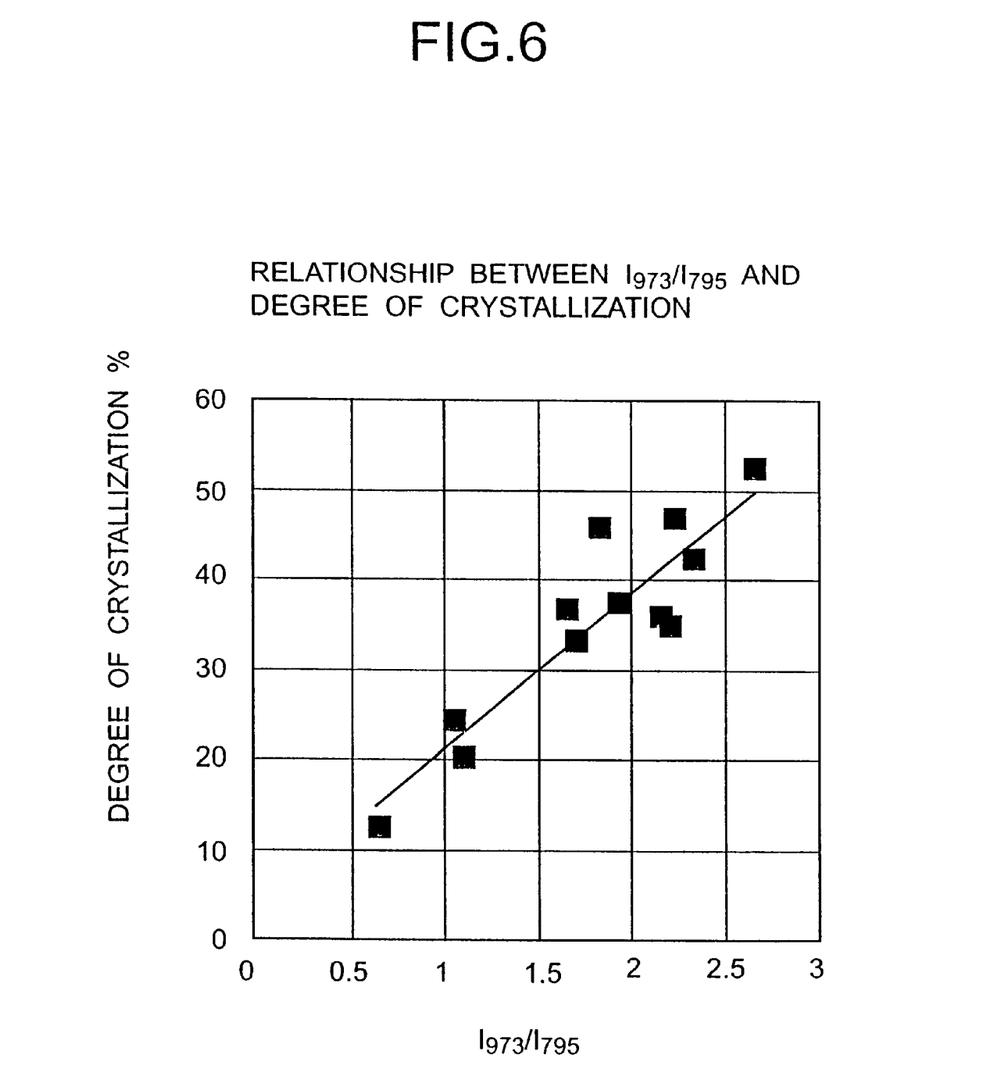
FIG. 6 is a diagram illustrating a relationship between $I_{973}/I_{795}$ and the degree of crystallization.

The film on the inner surface was isolated by dissolving the base member by using a hydrochloric acid aqueous solution at a portion 100 mm above the bottom of the can in a direction of 90 degrees relative to the direction of rolling the plate member, and the crystallization degree of the film was measured by using the IR. The measurement was taken for the surface layer and for the adhesion layer of the film based on the ATR method by using KRS-5 (45°), and there was obtained a chart shown in FIG. 4. From this chart were found peak intensities at 795 cm$^{-1}$ and 973 cm$^{-1}$. In the ATR method, the depth of measurement varies depending upon the wave number as shown in FIG. 5. Therefore, the peak intensities were found by correcting the peak intensities by the measuring depths 3.3 µm and 2.7 µm at 795 cm$^{-1}$ and 973 cm$^{-1}$ found from FIG. 5, the peak intensities on the side of the surface layer were denoted by Is$_{795}$, Is$_{973}$, the peak intensities on the side and the adhesion layer were denoted by Ia$_{795}$, Ia$_{973}$, crystallization degree Cs on the side of the surface layer and the crystallization degree Ca on the side of the adhesive layer were found from the following formulas. FIG. 6 shows a relationship between I$_{795}$/I$_{973}$ and the crystallization degree.

$$Cs=Is_{795}/Is_{973}, \quad Ca=Ia_{795}/Ia_{973}$$

(5) Measurement of Amorphous Parameter F.

The film on the inner surface was isolated by dissolving the base member by using a hydrochloric acid aqueous solution at a portion 60 to 100 mm above the bottom of the can in a direction of 90 degrees relative to the direction of rolling the plate member, a pole figure diagram was found by the above-mentioned method, and an amorphous parameter F was found from the pole figure diagram in compliance with the following formula, $$F=-0.95X_{100}-0.52X_{-105}+8.4$$

$X_{100}$: maximum diffraction intensity of the (100) plane,
$X_{-105}$: maximum diffraction intensity of the (−100) plane.

(6) Measurement of Coefficient of Orientation of the Resin Layer on the Bottom of the Can.

The base member of the bottom of the can was dissolved by using a hydrochloric acid aqueous solution to isolate the film on the inner surface of the film, and the refractive index was measured by using the Abbe's refractometer. The measurement was taken on the surface of the film, and the coefficient ns of surface orientation was found from the following formula, $$ns=[(nx+ny)/2]-nz$$

wherein nx is a refractive index of the film in a direction in parallel with the rolling of the base member, ny is a direction at 90 degree relative to the direction of the rolling of the base member, and nz is a direction of thickness.

(7) Retort Process Testing.

After the distilled water was filled at 95° C., the retort processing was executed at 135° C. for 30 minutes. The temperature was then returned back to room temperature, the distilled water was drained and was measured for its turbidity. Further, the state of the inner surface of the can was observed.

The turbidity was measured by using a handy-type highly sensitive turbidimeter/colorimeter manufactured by Yasui Kiki Co., by introducing 100 ml of a sample into a colorimetric tube for turbidity and putting it into a sample cell. As a standard for reference, further, a colorimetric tube for turbidity containing 100 ml of a diluted standard turbid solution was put into a comparative cell. The bottoms of these cells were seen through from the upper side, and the bottoms of the two were compared in regard to their brightness to measure the turbidity.

(8) Forming the Cans.

A wax-type lubricating agent was applied onto the laminate shown in Table 1, and a disk of a diameter of 140 mm was punched to obtain a shallow-drawn cup. The shallow-drawn cup was subjected to the bend-elongation (stretching)-ironing by redrawing to obtain a can. The can possessed the following properties.

Diameter of cup: 52 mm

Height of cup: 141 mm

Thickness of can wall to blank thickness: 37%

Thickness of flange to blank thickness: 69%

The bottom of the can was formed according to a customary method. Then, the can was heat-treated at 215° C., left to cool, the edge of the opening was trimmed, the curved surface was subjected to the printing, drying, necking and flanging, thereby to obtain a 250-ml seamless can.

TABLE 1

|  | Iso-phthalic acid (mol %) | Intrinsic viscosity (cc/g) | Half-crystal-lization time (sec) | Polymerization method |
|---|---|---|---|---|
| Resin A | 5 | 0.90 | 224 | solid-phase polymerization |
| Resin B | 10 | 1.06 | 530 | solid-phase polymerization |
| Resin C | 15 | 0.90 | 624 | solid-phase polymerization |
| Resin D | 25 | 0.9 | 1000 or more | solid-phase polymerization |
| Resin E | 2 | 0.68 | 15 | melt polymerization |
| Resin F | 28 | 1.05 | 1000 or more | solid-phase polymerization |

TABLE 2

| | Surface layer | Lower layer | Thickness ratio | Preparation of laminating member | Base material | Inner surface of top of can | | |
|---|---|---|---|---|---|---|---|---|
| | | | | | | Cs | Ca | F |
| Ex. 1 | A | C | 1:4 | extrusion-lami. | TFS | 1.38 | 1.05 | 5 |
| Ex. 2 | A | C | 1:13 | film-lami. | TFS | 1.39 | 1.02 | 5.2 |
| Ex. 3 | A | C | 13:1 | film-lami. | TFS | 1.37 | 1.06 | 3.5 |
| Ex. 4 | B | D | 1:4 | film-lami. | TFS | 1.2 | 0.8 | 5.5 |
| Ex. 5 | A | B | 1:4 | extrusion-lami. | Aluminum | 1.35 | 0.92 | 3.8 |
| Comp. Ex. 1 | E | F | 1:4 | extrusion-lami. | TFS | 1.53 | 0.78 | 3.6 |
| Comp. Ex. 2 | E | C | 1:4 | film-lami. | TFS | 1.52 | 1.03 | 3.5 |
| Comp. Ex. 3 | E | A | 1:4 | film-lami. | TFS | 1.53 | 1.31 | 2.3 |
| Comp. Ex. 4 | C | A | 1:4 | film-lami. | TFS | 1.12 | 1.58 | 3.3 |
| Comp. Ex. 5 | C | C | 1:4 | film-lami. | TFS | 1.12 | 1.03 | 3.6 |
| Comp. Ex. 6 | C | F | 1:4 | film-lami. | TFS | 1.1 | 0.81 | 3.8 |
| Comp. Ex. 7 | A | F | 1:4 | film-lami. | TFS | 1.35 | 0.79 | 5.1 |
| Comp. Ex. 8 | A | A | 1:4 | film-lami. | Aluminum | 1.31 | 1.19 | 1.5 |
| Comp. Ex. 9 | A | C | 1:30 | film-lami. | TFS | 1.38 | 1.01 | 4.8 |
| Comp. Ex. 10 | A | C | 30:1 | film-lami. | TFS | 1.36 | 1.05 | 2.3 |
| Comp. Ex. 11 | oriented film | | | film-lami. | TFS | 1.45 | 1.22 | 4.3 |

| | Coefficient of surface orientation of inner surface on bottom of can | Formation of can | Retort testing | |
|---|---|---|---|---|
| | | | State | Turbidity |
| Ex. 1 | 0.01 or less | good | good | 0.7 |
| Ex. 2 | 0.01 or less | good | good | 0.9 |
| Ex. 3 | 0.01 or less | good | good | 0.5 |
| Ex. 4 | 0.01 or less | good | good | 1.1 |
| Ex. 5 | 0.01 or less | good | good | 0.7 |
| Comp. Ex. 1 | 0.01 or less | good | film floated on neck | |
| Comp. Ex. 2 | 0.01 or less | film cracked on upper part of can | can barrel corroded | 3.4 |

TABLE 2-continued

| Comp. Ex. 3 | 0.01 or less | film cracked on upper part of can | can barrel corroded much | |
|---|---|---|---|---|
| Comp. Ex. 4 | 0.01 or less | good | can barrel corroded much | |
| Comp. Ex. 5 | 0.01 or less | good | good | 3.8 |
| Comp. Ex. 6 | 0.01 or less | good | film floated on neck | |
| Comp. Ex. 7 | 0.01 or less | good | film floated on neck | |
| Comp. Ex. 8 | 0.01 or less | film cracked much on upper part of can | | |
| Comp. Ex. 9 | 0.01 or less | good | good | 3.5 |
| Comp. Ex. 10 | 0.01 or less | film cracked much on upper part of can | | |
| Comp. Ex. 11 | 0.06 | film cracked much on upper part of can | | |

According to the present invention, there is provided a resin-coated seamless can formed of a resin-coated metal plate having substantially unoriented two layers including a surface layer and a lower layer serving as a resin layer on the inner surface side of the can, wherein the surface layer comprises a polyethylene terephthalate/isophthalate containing an isophthalic acid in an amount of from 3 to 13 mol % and having an intrinsic viscosity [η] of not smaller than 0.7, and the lower layer comprises a polyethylene terephthalate/isophthalate containing the isophthalic acid in an amount of from 8 to 25 mol %, which is larger than that of the surface layer, and having an inherent viscosity [η] of not smaller than 0.7, the resin layer of the upper part of the can on the inner surface side satisfying the following formula (1), $$Cs > Ca \quad (1)$$

where $Cs = Is_{973}/Is_{795}$, $Ca = Ia_{973}/Ia_{795}$, $Is_{973}$ is an infrared absorption intensity at 973 cm$^{-1}$ measured for the surface layer, $Is_{795}$ is an infrared absorption intensity at 795 cm$^{-1}$ measured for the surface layer, $Ia_{973}$ is an infrared absorption intensity at 973 cm$^{-1}$ measured for the lower layer and $Ia_{795}$ is an infrared absorption intensity at 795·cm$^{-1}$ measured for the lower layer, and, preferably, the coefficient of surface orientation of the resin layer on the inner surface side on the bottom of the can being not larger than 0.05.

Thus, there is provided a seamless can featuring high degree of workability of which the thickness can be very decreased, maintaining good adhesion between the metal plate and the coating resin and exhibiting excellent corrosion resistance and resistance against being dented even when it is placed under high temperature and wet heated conditions such as in a hot vending machine or through the retort sterilization. Further, low-molecular components do not elute into the content even through the processing at high temperatures or after preserved for extended periods of time, preventing the content from becoming turbid, and offering excellent flavor-retaining property. Further, the can is suited for storing even acidic beverages.

According to the present invention which uses an unoriented film or a resin applied by extrusion coating, further, the step of drawing is eliminated enabling the steps of production to be simplified and the cost to be decreased.

What is claimed is:

1. A resin-coated seamless can formed of a resin-coated metal plate having substantially unoriented two resin layers including a lower layer on the inside of the can and a surface layer on the lower layer, wherein the surface layer comprises a polyethylene terephthalate/isophthalate containing an isophthalic acid in an amount of from 3 to 13 mol % and having an intrinsic viscosity [η] of not smaller than 0.7, and the lower layer comprises a polyethylene terephthalate/isophthalate containing the isophthalic acid in an amount of from 8 to 25 mol %, which is larger than that of the surface layer, and having an intrinsic viscosity [η] of not smaller than 0.7, the resin layer on the inside of the upper part of the can satisfying the following formula (1), $$Cs > Ca \quad (1)$$

where $Cs = Is_{973}/Is_{795}$, $Ca = Ia_{973}/Ia_{795}$, $Is_{973}$ is an infrared absorption intensity at 973 cm$^{-1}$ measured for the surface layer, $Is_{795}$ is an infrared absorption intensity at 795 cm$^{-1}$ measured for the surface layer, $Ia_{973}$ is an infrared absorption intensity at 973 cm$^{-1}$ measured for the lower layer and $Ia_{795}$ is an infrared absorption intensity at 795 cm$^{-1}$ measured for the lower layer.

2. A resin-coated seamless can according to claim 1, wherein the coefficient of surface orientation of the resin layer on the inside of the bottom of the can is not larger than 0.05.

3. A resin-coated seamless can according to claim 1 or 2, wherein the half-crystallization time of the lower layer at 160° C. is not shorter than 100 seconds.

4. A resin-coated seamless can according to claim 1, wherein the polyethylene terephthalate/isophthalate of the surface layer and of the lower layer is formed by the solid-phase polymerization method.

5. A resin-coated seamless can according to claim 1, wherein the surface layer (A) and the lower layer (B) have a thickness ratio of, A:B=1:15 to 15:1.

6. A resin-coated seamless can according to claim 1, wherein the surface layer and the lower layer are laminated by the lamination of multi-layer cast films.

7. A resin-coated seamless can according to claim 1, wherein the surface layer and the lower layer are formed by the co-extruded coating.

8. A resin-coated seamless can according to claim 1, wherein said resin-coated seamless can is obtained by drawing, stretch-drawing, or by these forming methods in combination with ironing.

9. A resin-coated seamless can according to claim 1, wherein the surface layer and the lower layer, in an upper part of the can, have an amorphous parameter (F) defined by the following formula (2), $$F = -0.95X_{100} - 0.52X_{105} + 8.4 \quad (2)$$

wherein $X_{100}$ is a maximum value of normalized strength of X-ray diffraction obtained from an X-ray diffraction pole figure diagram of a (100) plane, and $X_{-105}$ is a maximum value of normalized strength of X-ray diffraction obtained from an X-ray diffraction pole figure diagram of a (−105) plane, of not smaller than 3.

* * * * *